United States Patent
Rösel et al.

(10) Patent No.: US 11,732,671 B2
(45) Date of Patent: Aug. 22, 2023

(54) METHOD FOR REGULATING THE TOTAL INJECTION MASS DURING A MULTIPLE INJECTION OPERATION

(71) Applicant: Vitesco Technologies GmbH, Regensburg (DE)

(72) Inventors: Gerd Rösel, Regensburg (DE); Peter Senft, Rieden (DE)

(73) Assignee: Vitesco Technologies GmbH, Regensburg (DE)

( * ) Notice: Subject to any disclaimer, the term of this patent is extended or adjusted under 35 U.S.C. 154(b) by 0 days.

(21) Appl. No.: 17/655,115

(22) Filed: Mar. 16, 2022

(65) Prior Publication Data
US 2022/0205407 A1 Jun. 30, 2022

Related U.S. Application Data

(63) Continuation of application No. PCT/EP2020/074344, filed on Sep. 1, 2020.

(30) Foreign Application Priority Data

Sep. 18, 2019 (DE) .................. 10 2019 214 230.3

(51) Int. Cl.
*F02D 41/40* (2006.01)
*F02D 41/20* (2006.01)

(52) U.S. Cl.
CPC .......... *F02D 41/402* (2013.01); *F02D 41/20* (2013.01); *F02D 2041/2024* (2013.01); *F02D 2200/0616* (2013.01)

(58) Field of Classification Search
CPC ........ F02D 41/20; F02D 41/40; F02D 41/402; F02D 2200/0616; F02D 2041/2024; F02D 2041/2058; F02D 2041/224
See application file for complete search history.

(56) References Cited

U.S. PATENT DOCUMENTS 4,896,644 A * 1/1990 Kato ................ F02D 41/126
123/492
5,570,673 A * 11/1996 Isobe ................ F02D 41/148
123/688

(Continued)

FOREIGN PATENT DOCUMENTS

DE 102004054240 A1 5/2006
DE 102008041659 A1 3/2009

(Continued)

OTHER PUBLICATIONS

International Search Report and Written Opinion dated Nov. 11, 2020 from corresponding International Patent Application No. PCT/EP2020/074344.

(Continued)

*Primary Examiner* — John Kwon
*Assistant Examiner* — Johnny H Hoang

(57) ABSTRACT

A method for controlling the total injection mass per working cycle during a multiple injection operation of a fuel injector of an internal combustion engine is provided. In the method, an injection mass difference is determined from individual injection pulse to individual injection pulse, and transferred to the next individual injection pulse, in stepwise fashion. The injection mass difference remaining in the penultimate individual injection pulse is transferred to the final individual injection pulse to achieve a total injection mass with improved tolerance.

4 Claims, 1 Drawing Sheet

(56) References Cited

U.S. PATENT DOCUMENTS

| | | | |
|---|---|---|---|
| 2003/0164166 A1* | 9/2003 | Takeuchi | F02D 41/402 123/674 |
| 2004/0040534 A1* | 3/2004 | Herden | F02D 41/402 123/299 |
| 2008/0319636 A1* | 12/2008 | Nakagawa | F02D 41/047 701/104 |
| 2009/0063016 A1 | 3/2009 | Nakata | |
| 2009/0063018 A1* | 3/2009 | Takeuchi | F02D 41/1497 701/104 |
| 2012/0185155 A1* | 7/2012 | Nakata | F02D 41/2096 701/104 |
| 2013/0104636 A1* | 5/2013 | Beer | F02D 41/247 73/114.49 |
| 2015/0184626 A1 | 7/2015 | Denk | |
| 2016/0208727 A1* | 7/2016 | Ito | F02D 41/263 |
| 2017/0241361 A1* | 8/2017 | Nakasaka | F02D 41/401 |

FOREIGN PATENT DOCUMENTS

| | | |
|---|---|---|
| DE | 102009052219 A1 | 5/2011 |
| DE | 102012200275 A1 | 7/2013 |
| DE | 102012213883 A1 | 2/2014 |
| DE | 102012222864 A1 | 6/2014 |

OTHER PUBLICATIONS

German Office Action dated Mar. 10, 2020 for corresponding German Patent Application No. 10 2019 214 230.3.

* cited by examiner

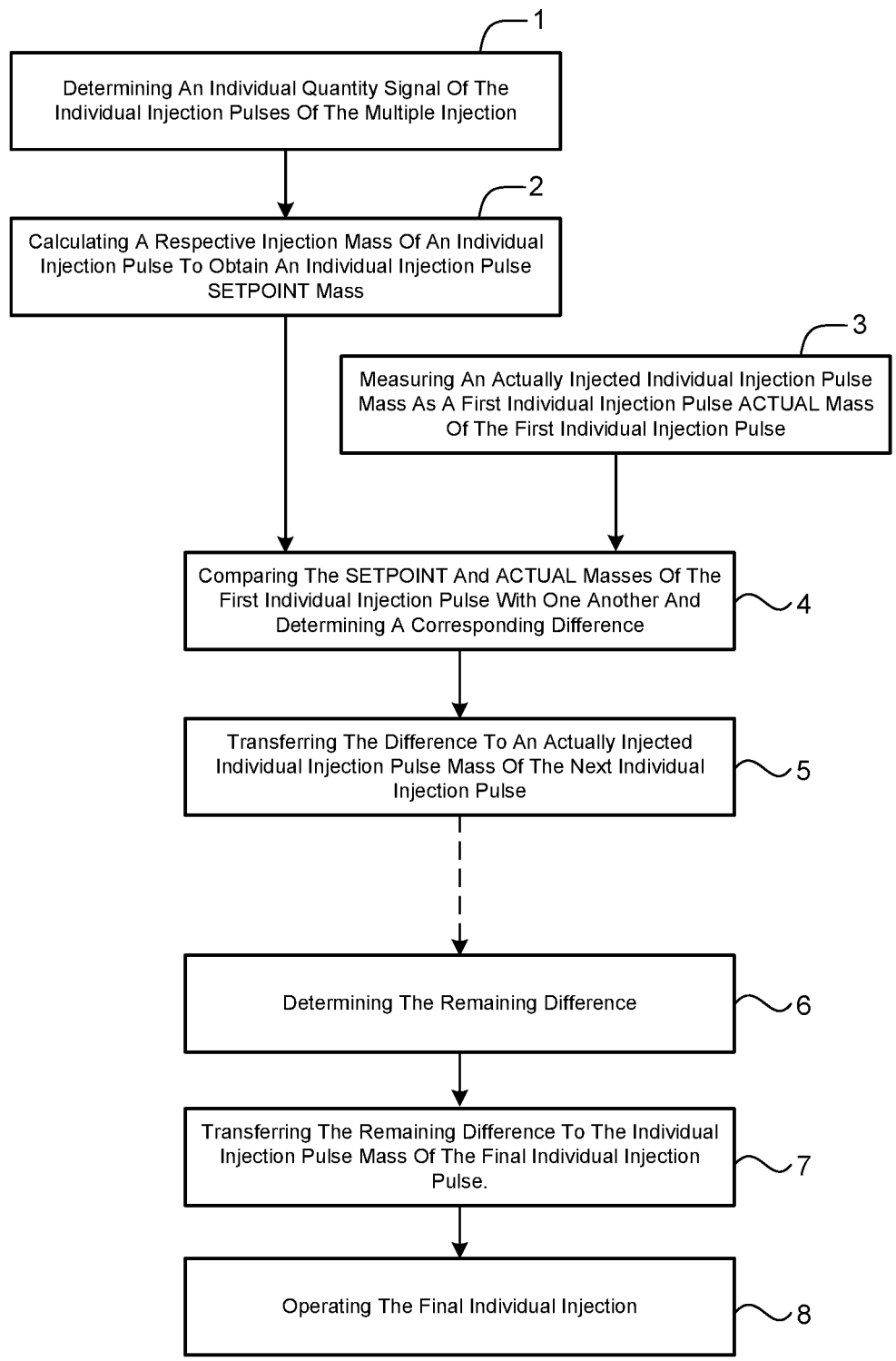

METHOD FOR REGULATING THE TOTAL INJECTION MASS DURING A MULTIPLE INJECTION OPERATION

CROSS-REFERENCE TO RELATED APPLICATIONS

This application claims the benefit of PCT Application PCT/EP2020/074344, filed Sep. 1, 2020, which claims priority to German Application 10 2019 214 230.3, filed Sep. 18, 2019. The disclosures of the above applications are incorporated herein by reference.

TECHNICAL FIELD

The disclosure relates to a method for controlling the total injection mass per working cycle during a multiple injection operation of a fuel injector of an internal combustion engine.

BACKGROUND

Methods for splitting up the fuel mass into multiple injection pulses with an increasing number of pulses are known specifically from use in the diesel sector. In conjunction with the reduction of the number of particles in the case of Otto-cycle engines, an increase of the injection pulses is used with the objective of reducing fuel penetration. The aim here is to set a constant fuel mass per working cycle, which is of particular importance for the emissions of an Otto-cycle engine.

Control methods are known with which, in the case of injection valves, the fuel masses of the individual pulses of the multiple injection can be controlled. These control concepts operate as adaptive processes and can thus compensate for slow deviations in the injected fuel mass. Short-term deviations, that is to say deviations from injection operation to injection operation, cannot be compensated for with this method.

A method for adapting the profile with respect to time of a current which flows through a coil of a coil drive of a fuel injector and which leads to a multiple injection of fuel with at least two partial injection operations during the operation of an internal combustion engine of a motor vehicle is known. Here, the profile with respect to time of the current is adapted for each partial injection operation, which has at least one boost phase and one free-running phase.

A method and a device for actuating a fuel injector having a coil drive for an internal combustion engine is also known, where a first electrical excitation, which is assigned to a first partial injection during a second working cycle, and a second electrical excitation, which is assigned to a second partial injection during the second working cycle, are applied to the coil. Here, the second electrical excitation for the second working cycle is modified in relation to the second electrical excitation for a first working cycle, where the modification is a function of the calculated time difference.

Another known method relates to the determination of a movement behavior of a fuel injector based on the movement behavior in a modified operating state involving multiple injection.

SUMMARY

The disclosure relates to creating a method in which the total injection mass per working cycle is controlled with an improved tolerance. The method includes: determining the individual quantity signal of the individual injection pulses of the multiple injection; calculating from this a respective injection mass of an individual injection pulse (individual injection pulse SETPOINT mass); and measuring an actually injected individual injection pulse mass (first individual injection pulse ACTUAL mass) of the first individual injection pulse using an operating parameter of the internal combustion engine. The method also includes: determining the injection mass difference $D_1$ between the SETPOINT and ACTUAL mass of the first injection pulse; measuring an actually injected individual injection pulse mass of a further individual injection pulse using an operating parameter of the internal combustion engine; and transferring the difference $D_1$ to the actually injected individual injection pulse mass of the further injection pulse. Additionally, the method includes determining the then remaining difference in relation to the individual injection pulse SETPOINT mass of the further injection pulse. The corresponding differences are determined and transferred up until the penultimate individual injection pulse, and the remaining difference of the penultimate individual injection pulse then obtained is transferred to the individual injection pulse ACTUAL mass of the final individual injection pulse of the multiple injection.

Implementations of the disclosure may include one or more of the following optional features. In some implementations, by contrast to the known adaptation methods, in which a determined difference between the SETPOINT and ACTUAL injection mass of an individual injection pulse is added to all individual injection pulses of a multiple injection, the method follows a stepwise approach, where the determined difference between the SETPOINT injection mass and the ACTUAL injection mass of the first individual injection pulse is added to the ACTUAL individual injection mass of the next individual injection pulse, the then remaining difference in relation to the SETPOINT injection mass of this individual injection pulse is determined and added to the ACTUAL individual injection mass of the next individual injection pulse, etc., until a corresponding difference remains at the penultimate individual injection pulse. This difference is then added to the ACTUAL individual injection mass of the final pulse to obtain a corresponding compensation of the total injection mass of the working cycle of the multiple injection.

The control method discussed provides an improved tolerance of the total quantity of fuel mass per working cycle, such as in the case of an increasing number of injection pulses and when used in Otto-cycle engines. This total mass of fuel in relation to the inducted mass of fresh gas is decisive for the exhaust-gas aftertreatment, specifically in the case of 3-way catalytic converters.

In some implementations, the control method described above, which relates to the control of the total injection mass per working cycle of a multiple injection, is combined with control of the individual injection pulses. Such control of the individual injection pulses may involve a known control method for quantity equalization at coil injectors or the like (COSI control). Such COSI control (Controlled Solenoid Injection) is known and is a special control method for individual injections. According to the disclosure, control of the respective individual injection pulses is thus performed here in addition to the control of the total injection mass per working cycle.

The multiple injection described here may be one that has at least two individual injections. However, the method has an advantageous effect in the case of a multiple injection operation which has a relatively large number of individual injections, for example up to 10, per working cycle. As has also already been mentioned, the method is suitable for multiple injections of Otto-cycle engines.

The details of one or more implementations of the disclosure are set forth in the accompanying drawings and the description below. Other aspects, features, and advantages will be apparent from the description and drawings, and from the claims.

DESCRIPTION OF DRAWINGS

FIG. 1 shows an exemplary schematic flow diagram of a method for controlling a total injection mass.

Like reference symbols in the various drawings indicate like elements.

DETAILED DESCRIPTION

A method according to the disclosure will be explained based on a multiple injection of a fuel injector of an Otto-cycle engine. The multiple injection is made up here of n individual injections within one working cycle.

In a first step of the method, which is identified by block 1 in FIG. 1, an individual quantity signal of the individual injection pulses of the multiple injection is determined. In a second step identified by block 2, this results in a calculation of a respective injection mass of an individual injection pulse to obtain an individual injection pulse SETPOINT mass.

Furthermore, in a third step identified by block 3, an actually injected individual injection pulse mass is measured as a first individual injection pulse ACTUAL mass of the first individual injection pulse, where this is done by measuring a suitable operating parameter of the internal combustion engine.

In a fourth step identified by block 4, the SETPOINT and ACTUAL masses of the first individual injection pulse are compared with one another, and a corresponding difference $D_1$ between the two is determined.

This difference $D_1$ is transferred in a fifth step identified by block 5 to an actually injected individual injection pulse mass of the next individual injection pulse, which was determined in the same way as in the third step. There then follows again a comparison between the SETPOINT and ACTUAL mass, where a difference $D_2$ is obtained. This is then transferred again to the individual injection pulse mass of the next individual injection pulse.

The method is carried out in this way up until the penultimate individual injection pulse. The remaining difference $D_{n-1}$ then determined in accordance with a sixth step identified by block 6 is transferred in a seventh step identified by block 7 to the individual injection pulse mass of the final individual injection pulse. Overall, a total injection mass of the multiple injection is thus obtained with which an improved tolerance of the total quantity of the fuel mass per working cycle can be achieved. The injection operation of the final individual injection is denoted by 8 in FIG. 1.

The examples described and illustrated here may for example involve 8 individual injection operations. If, for example, a difference $D_1$ of the injection mass of 5% is determined in the case of the first individual injection pulse, this difference of 5% is applied to the second pulse. If a difference of 4% is determined in the case of the second pulse, the 4% is applied to the third pulse, until, in this way, a difference of 1% remains in the case of the penultimate pulse (7th pulse), for example. This is then transferred to the 8th pulse, such that the desired compensation with regard to the total injection mass is achieved in this way.

A number of implementations have been described. Nevertheless, it will be understood that various modifications may be made without departing from the spirit and scope of the disclosure. Accordingly, other implementations are within the scope of the following claims.

What is claimed is:

1. A method for controlling a total injection mass per working cycle during a multiple injection operation of a fuel injector of an internal combustion engine, the method comprising:
   determining an individual quantity signal of individual injection pulses of the multiple injection operation;
   calculating a respective injection mass of an individual injection pulse as an individual injection pulse SETPOINT mass;
   measuring a first actually injected individual injection pulse mass as a first individual injection pulse ACTUAL mass of the first individual injection pulse using an operating parameter of the internal combustion engine;
   determining an injection mass difference between the SETPOINT mass and the ACTUAL mass of the first injection pulse;
   measuring a further actually injected individual injection pulse mass of a further individual injection pulse using the operating parameter of the internal combustion engine;
   transferring the injection mass difference to the further actually injected individual injection pulse mass of the further individual injection pulse; and
   determining a remaining difference in relation to an individual injection pulse SETPOINT mass of the further individual injection pulse,
   wherein the injection mass differences are determined and transferred up until a penultimate individual injection pulse, and a remaining difference of the penultimate individual injection pulse then obtained is transferred to an individual injection pulse ACTUAL mass of a final individual injection pulse of the multiple injection.

2. The method of claim 1, further comprising: controlling the individual injection pulses.

3. The method of claim 2, further comprising: controlling quantity equalization at coil injectors.

4. The method as of claim 1, wherein the method is used in Otto-cycle engines.

* * * * *